United States Patent Office 2,964,499
Patented Dec. 13, 1960

2,964,499

CERTAIN SILICIC ACID ESTERS AND POLYMERS THEREOF

Fritz Weigel, Schwabach, near Nurnberg, and Robert Schwarz, Aachen, Germany; said Weigel assignor to Siemens - Schuckertwerke Aktiengesellschaft, Berlin-Siemensstadt and Erlangen, Germany, a corporation of Germany No Drawing. Filed Mar. 18, 1957, Ser. No. 646,513

Claims priority, application Germany Mar. 17, 1956

13 Claims. (Cl. 260—47)

This invention relates to silicon containing high-molecular compounds having increased thermostability and to the method of making the same.

In order to convert monomolecular materials into high-molecular compounds, polymerization may be resorted to. As is known, such high-molecular compounds have found extensive technical use and many have been tried and tested for decades. To be sure, however, the applicability of these materials is greatly limited if they are to retain their original properties while exposed to higher temperatures for a long period of time. Thus it was found, for example, that purely organic high polymer compounds are not capable of permanently withstanding temperatures in excess of 150° C. Only the silicones are able to resist continuous heat at 170–180° C. without any substantial influence upon their physical properties. Therefore extreme conditions require the use of silicones. However, the high price of silicones must be taken in consideration. Attempts have also been made to use for this purpose the substantially cheaper silicic acid esters, such as the polysilicic acid ethylester, polysilicic acid butylester, aromatic silicic acid esters of the various phenols, etc., but it was found that, although they are superior to purely organic materials in so far as their thermal properties are concerned, they are not quite as stable as the silicones.

According to this invention certain monomolecular silicic acid esters can be converted into high-molecular compounds that, in their thermal stability, are not only equal to the silicones but, in addition, can be produced more economically than the latter. More specifically, we found that the orthosilicic acid ester of o,o'-diphenol, that is, the di-o,o'-dioxydiphenesilane of the formula;

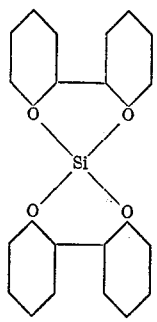

can be used as a thermally extremely stable building block in making high-molecular compounds. This orthosilicate has a melting point of 319° C. and can be sublimated in vacuo without decomposition. The principle of the present invention consists in providing this silane with reactive groups which permit the conversion of this monomeric compound into high-molecular materials according to customary methods. Depending upon the number and type of the reactive groups introduced into the molecule, the nature of the high-molecular material can be influenced; in other words, it can be provided with either a substantially linear or a branched structure. If, for example, only one polymerizable group (R)

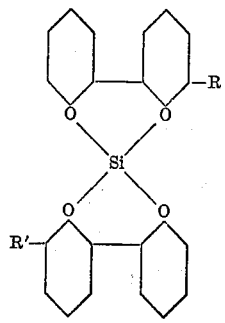

is introduced, a substantially linear structure is obtained upon polymerization. If, on the other hand, the other diphenyl rest also carries a polymerizable group (R'), polymerization produces highly branched materials.

As reactive groups that can be introduced we found especially suitable monovalent hydrocarbons having a >C=C< radical, such as allyl, methallyl and vinyl groups which, by means of appropriate catalysts, may be polymerized.

Such catalysts are, for example, benzoyl-, lauryl-, methylethylketone peroxide, tert.butylhydroperoxide, ascaridol, tert.butylperbenzoate, ditertiary butyldiperphthalate, ozonide and borotrifluoride ether. 0.1 to 3 percent by weight of these catalysts is usually used but, if desired, larger or smaller quantities may be added.

More particularly, the following compounds of the vinyl addition type have been employed: monostyrol, vinylchloride, vinyltolual, 2,4-dichlorostyrol, α- and p-methylstyrol, vinyl acetate, methylmethacrylate, ethylacrylate, butylmethacrylate, methallyl alcohol, acrylonitrile, methylvinyl ketone and 1,3-chloroprene. These compounds may be used singly or in various mixtures.

The materials made according to the present invention have exceptional utility. Depending upon structure, hardening properties, solubility, etc., they may be used as casting resins, raw material for lacquers and foils, impregnating material for electrical purposes and so on, whereby the high degree of thermal resistance of these materials is to be particularly emphasized.

*Example 1*

86 g. of potassium carbonate and 133 g. of allyl bromide (1 mol+10% excess) are treated with 150 cc. of acetone and heated under reflux to about 80° C. in a three-neck flask while stirring and adding dropwise a solution of 186 g. of o,o'-diphenol (1 mol) in 200 cc. of acetone over a period of about two hours. After about ten hours, the mono-allylether of the diphenol is obtained at a yield of about 90% upon removal of potassium bromide and potassium carbonate by filtration and of excessive allyl bromide by distillation. 226 g. of the mono-allylether (1 mol) are then heated with 11 g. of diethylaniline for one hour to 240° C., which causes a rearrangement of the ether to o-allyldiphenol (Claisen reaction). Upon removal of the diethylaniline, pure allyldiphenol is recovered (OH-number: found 494, theor. 496).

50 g. of allyldiphenol are heated together with 35 g. of ethyl-o-silicate in an oil bath to 145° C. whereby ethyl alcohol is distilled off and a theoretical yield of 6,6"-dillyl bis-2,2'-diphenylene-silicic acid ester

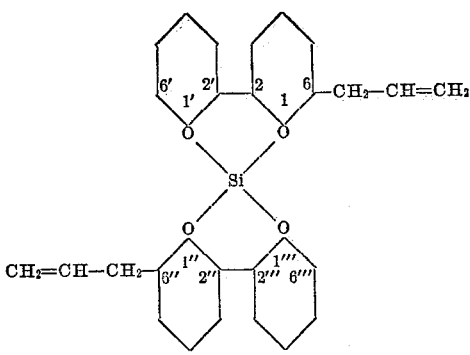

is obtained. This reaction product is a soft resin having the following characteristics:

|  | theor. | found |
| --- | --- | --- |
| OH-number | 0 | 0 |
| M.W. | 477 | 473 |
| Si-content _____percent | 5.89 | 5.93 |

The compound obtained in the foregoing manner which, at 100° C., is a readily pouring, thin liquid, is then stepwise polymerized in the presence of 1% of benzoylperoxide, according to the following scheme:

2 hours at 60° C.
2 hours at 80° C.
2 hours at 100° C.
2 hours at 120° C.

In order to define the thermal stability, a film 0.1 mm. thick of the resulting polymerizate is aged for five hundred hours at 175° C. whereupon the weight loss is determined.

The following table provides a comparison with other materials:

Weight loss after five hundred hours at 175° C., percent

| Polystyrol | 32 |
| --- | --- |
| Isopropylpolysilicic acid ester | 16 |
| Various silicones | 3–8 |
| Polymerizate according to Example 1 | 3 |

*Example 2*

50 g. monostyrol to which 2 g. of benzoylperoxide have been added are intimately mixed with 50 g. of the diallyl compound prepared according to Example 1. Upon polymerizing for 2 hours at 60° C., 2 hours at 80° C., 2 hours at 100° C. and 8 hours at 140° C., a copolymerizate is obtained a 0.1 mm. film of which shows a weight loss of 7% after 500 hours of aging at 175° C.

We claim:
1. Compounds of the general formula

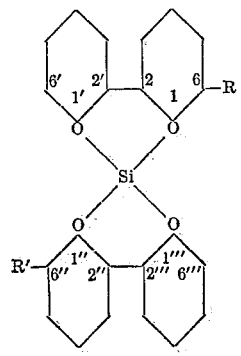

wherein R represents a radical of the group consisting of allyl, methallyl and vinyl and R' represents a member of the class consisting of hydrogen, allyl, methallyl, and vinyl.

2. 6,6"-diallyl-bis-2,2'-diphenylene-silicic acid ester.
3. 6-allyl-bis-2,2'-diphenylene-silicic acid ester.
4. 6,6"-diallyl-bis-2,2'-diphenylene-silicic acid ester, copolymerized with at least one compound of the group consisting of monostyrol, vinylchloride, vinyltolual, 2,4-dichlorostyrol, α- and p-methylstyrol, vinyl acetate, methylmethacrylate, ethylacrylate, butylmethacrylate, methallyl alcohol, acrylonitrile, methylvinyl ketone and 1,3-chloroprene.
5. 6-allyl-bis-2,2'-diphenylene-silicic acid ester, copolymerized with at least one compound of the group consisting of monostyrol, vinylchloride, vinyltolual, 2,4-dichlorostyrol, α- and p-methylstyrol, vinyl acetate, methylmethacrylate, ethylacrylate, butylmethacrylate, methallyl alcohol, acrylonitrile, methylvinyl ketone and 1,3-chloroprene.
6. A heat resistant resin comprising a homopolymer of a compound of the general formula

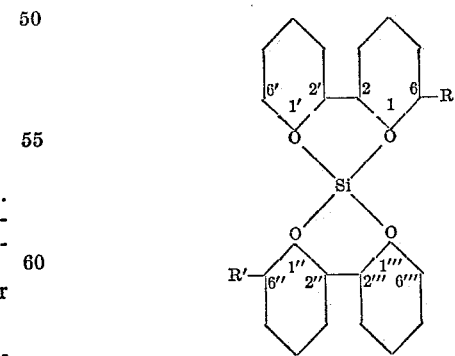

wherein R represents a radical of the group consisting of allyl, methallyl and vinyl and R' represents a member of the class consisting of hydrogen, allyl, methallyl, and vinyl.

7. A heat resistant resin comprising a homopolymer of 6,6"-diallyl-bis-2,2'-diphenylene-silicic acid ester.
8. A heat resistant resin comprising a homopolymer of 6-allyl-bis-2,2'-diphenylene-silicic acid ester.
9. A method of preparing a heat resistant silicon containing high molecular weight homopolymer resin, comprising heating a compound of the general formula

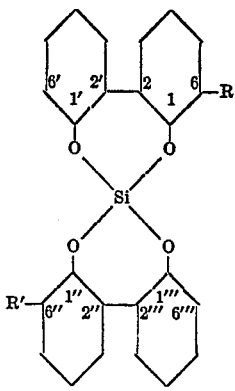

wherein R represents a radical of the group consisting of allyl, methallyl and vinyl and R' represents a member of the class consisting of hydrogen, allyl, methallyl and vinyl, in the presence of a polymerization catalyst taken from the group consisting of benzoyl-, lauryl-, methylethylketone peroxide, tert.butylhydroperoxide, ascaridol, tert.butylperbenzoate, ditertiary butyldiperphthalate, ozonide and borotrifluoride ether.

10. A method of preparing a heat resistant silicon containing high molecular weight copolymer resin which comprises heating a compound of the general formula

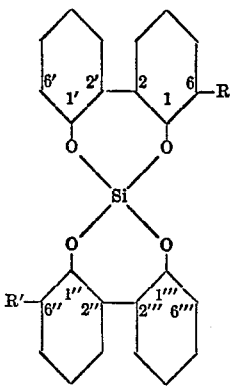

wherein R represents a radical of the group consisting of allyl, methallyl and vinyl, and R' represents a member of the class consisting of hydrogen, allyl, methallyl and vinyl, together with a compound taken from the group consisting of monostyrol, vinyl chloride, vinyl tolual, 2,4-dichlorostyrol, α- and p-methylstyrol, vinyl acetate, methylemethacrylate, ethylacrylate, butylmethacrylate, methallyl alcohol, acrylonitrile, methylvinyl ketone and 1,3-chloroprene, in the presence of a polymerization catalyst taken from the group consisting of benzoyl-, lauryl-, methylethylketone peroxide, tert.butylhydroperoxide, ascaridol, tert.butylperbenzoate, ditertiary butyldiperphthalate, ozonide and borotrifluoride ether.

11. A heat resistant resin comprising a homopolymer of a compound of the general formula

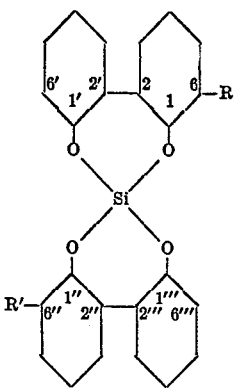

wherein R represents a radical of the group consisting of allyl, methallyl and vinyl and R' represents a member of the class consisting of hydrogen, allyl, methallyl and vinyl, with monostyrol.

12. A heat resistant resin comprising a copolymer of a compound of the general formula

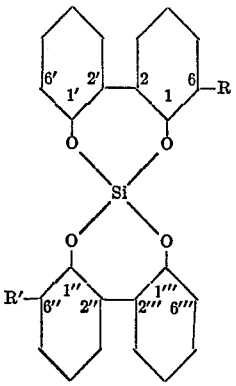

wherein R represents a radical of the group consisting of allyl, methallyl and vinyl and R' represents a member of the class consisting of hydrogen, allyl, methallyl and vinyl, with a compound of the group consisting of monostyrol, vinyl chloride, vinyl tolual, 2,4-dichlorostyrol, α- and p-methylstyrol, vinyl acetate, methylmethacrylate, ethylacrylate, butylmethacrylate, methallyl alcohol, acrylonitrile, methylvinyl ketone and 1,3-chloroprene.

13. A heat resistant resin comprising a copolymer of 6,6''-diallyl-bis-2,2'-diphenylene-silicic acid ester and monostyrol.

References Cited in the file of this patent

FOREIGN PATENTS

| 929,189 | Germany | June 20, 1955 |
| 1,118,776 | France | Mar. 26, 1956 |